United States Patent [19]
Wooldridge et al.

[11] 3,813,843
[45] June 4, 1974

[54] METHOD AND APPARATUS FOR ROLLING CUT FILTER PAD

[75] Inventors: James E. Wooldridge, Madison; Ronald P. Martin, New Albany, both of Ind.

[73] Assignee: Wehr Corporation, Milwaukee, Wis.

[22] Filed: June 9, 1972

[21] Appl. No.: 261,413

[52] U.S. Cl. .................. 53/21 FW, 53/118, 53/123, 242/55.1
[51] Int. Cl. ........................................... B65b 63/04
[58] Field of Search ........ 53/21 FW, 118, 119, 123, 53/211; 242/67.3, 55.1

[56] References Cited
UNITED STATES PATENTS
2,681,702  6/1954  Kuenn et al. ..................... 53/118 X
2,789,406  4/1957  Mosier ............................. 53/211 X
3,595,495  7/1971  Cloeren ........................... 242/75.51

*Primary Examiner*—Travis S. McGehee

[57] ABSTRACT

Cut filter pads are delivered to a roll station where kraft paper is drawn from a free-wheeling supply roll and threaded through a series of idler rolls and driven feed rolls to a driven take-up roll. From the last of the driven feed rolls the kraft paper has a generally horizontal extension to the take-up roll onto which the cut filter pads are discharged. The filter pads move with the paper into the take-up roll where the pads are compressed between adjacent layers of the paper as it is wound onto the take-up roll. When a given number of cut pads have been wound into the take-up roll, the roll station is stopped, the paper cut, and the roll closed by taping the cut end to the roll paper.

15 Claims, 2 Drawing Figures

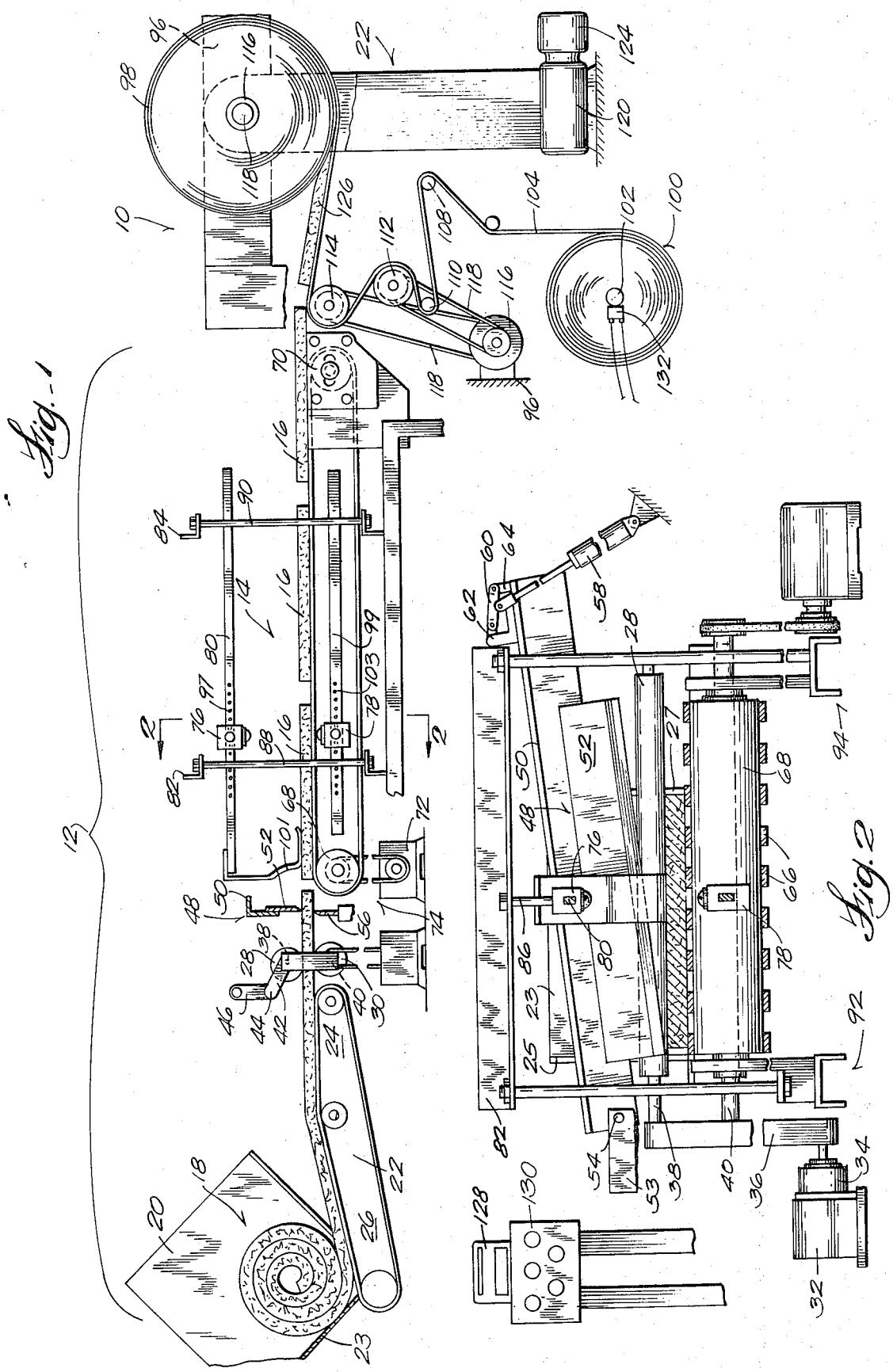

METHOD AND APPARATUS FOR ROLLING CUT FILTER PAD

BACKGROUND OF THE INVENTION

This invention relates to a method and apparatus for handling and shipping cut filter pads, for example replacement filter pads.

Cut filter pads for use as the filter medium in air filter apparatus present a problem from the standpoint of shipping and storage. Because of the air pervious nature of these pads, (such pads being made from material such as fiber glass, dacron, and polyester materials) the major portion of the volume of the filter is air. The filter materials are usually readily compressible but also have a marked spring-like characteristic. Thus, stacking or otherwise storing the filter pads in their natural, or relaxed, state, means that a substantial amount of space is occupied by the pads beyond that which would be required for the solid material in the filter alone. If the filter pads are stored in a compressed state, thereby reducing their volume and the storage space required, then some means must be provided to maintain the compressed state because of the spring-like characteristic. For example, if a number of filter pads were shipped in a carton, it would be desirable to compress the filter pads to maximize the number of pads which can be carried in the carton. Holding the filter pads in the compressed state would be relatively simple since the carton will ultimately be closed but when the carton is open, to dispense filter pads, special attention would have to be given to the contents to avoid a "jack-in-the-box" effect when the carton is opened. This problem will probably be better appreciated if it is remembered that, in a replacement filter application, the pads will probably be used one or two at a time so that, if they are stored in a carton or the like, repeatedly opening and closing of the carton is required.

This invention is concerned with this problem of storing cut filter pads. It will be appreciated that although the invention will be described in connection with replacement filter pads for air filter apparatus, it does have application to other pervious members for use in filtering gaseous media in general.

SUMMARY OF INVENTION

Among the general objects of this invention are to provide a method, and apparatus, for handling cut filter pads in such a manner that they are compactly held for storage and/or shipment and later dispensing.

For the achievement of these and other objects, this invention discloses an arrangement whereby cut filter pads are delivered to a roll station. A continuous sheet of flexible material is threaded in the roll station and is coiled onto a take-up roll. Immediately upstream of the take-up roll, and just prior to the coiling action, the flexible material has an extension upon which cut filter pads are placed. The moving sheet material then draws the cut filter pads into the coil being formed. The take-up roll is driven to thereby draw the sheet material into the coil and maintain the sheet material under tension so that the cut filter pads are compressed between adjacent turns of the coil of sheet material.

Preferable tension is provided on the sheet material as it moves into the coil formed on the take-up roll and this may be accomplished by adjusting the speed of the take-up roll relative to the speed of the driven feed roll, or rolls. Also, it is preferred that the roll station be positioned at the end of a continuous belt conveyor which is associated with a cutting mechanism for cutting the desired lengths of filter pads from a continuous length of filter material fed to the cutter. The cut pads are carried by the moving conveyor to the roll station where they move onto the sheet material to be drawn into the coil.

A mechanism for directing a stream of compressed air onto the cut filter pads as they are drawn into the coil can be provided to assist in compression of the filter pad.

Other objects and advantages will be pointed out in, or be apparent from, the specification and claims, as will obvious modifications of the embodiment shown in the drawings in which:

FIG. 1 is a side elevation of the overall machine, illustrated somewhat schematically and with some parts removed for ease of illustration; and FIG. 2 is a section view generally along line 2 of FIG. 1.

DESCRIPTION OF PREFERRED EMBODIMENT

With particular reference to the drawing, roll station 10 is illustrated in association with a filter cutting machine 12 which includes a conveyor 14 positioned to transport cut filter pads 16 to the roll station.

The cutting machine can take forms other than that illustrated in the drawings and all of the specific details of construction thereof are not necessary to an understanding of the operation of the roll station; accordingly, a somewhat general illustration has been made of the cutting machine and it will only be generally described.

Throughout the specification, the terms "up" and "down" will be used and the basis of reference will be the direction of travel of the filter material and the cut filter pads.

A roll of filter medium 18 is positioned in a cradle assembly 20, the filter medium roll comprising a continuous length of filter medium, such as that mentioned above under "Background of Invention," rolled on itself. Cradle assembly 20 is associated with what is commonly referred to as a hump-back conveyor 22. This conveyor comprises a generally horizontal section 24 and a section 26 disposed at an angle to the horizontal. Cradle assembly 20 includes a back wall 23, a fixed side wall 25, and an adjustable side wall 27. The bottom of the cradle assembly is open so that filter media roll 18 rests on the upper surface of section 26 of the hump-back conveyor. Conveyor 22 is driven by its own motor (not shown).

A pair of pinch rollers 28 and 30 are positioned in vertical alignment relative to each other and down from hump-back conveyor 22. Pinch rollers 28 and 30 are driven by a motor 32, clutch 34 and a conventional drive train 36 connected to shafts 38 and 40 which support the pinch rollers respectively. As can be seen in the drawings, the filter medium is threaded between pinch rollers 28 and 30 to cooperate, with conveyor 22, in pulling the medium from roll 18. Pinch roller 28 is illustrated as being supported from bracket 42 connected to a pivotally mounted shaft 44 (shaft 44 extending the length of pinch roll 28 which in turn has a width commensurate with the width of hump-back conveyor 22), a bracket 42 being provided at both ends of the shaft and pinch roll. Handle 46 is connected to bracket 42 to provide for selectively pivoting the pinch roll upwardly and away from lower pinch roll 30, and also to provide a means, through which a biasing force, if desired, can be provided to insure proper driving engagement of the two pinch rolls with the filter medium.

A shear assembly 48 is positioned immediately down from pinch rolls 28 and 30. The shear assembly includes angle member 50 which carries an elongated knife blade 52. Angle 50 is pivotally connected to the frame 53 of the overall apparatus by pin 54. A second, fixed knife blade 56 is positioned below knife blade 52, the lower knife blade 56 being suitably connected to the frame of the overall machine. With this arrangement, blades 52 and 56 can be moved together with a scissors-type action to sever a length of filter medium to provide a cut filter pad 16. Any conventional drive mechanism can be provided to effect the scissors action. As schematically illustrated in FIG. 2, this can consist of a cylinder 58, hydraulically or pneumatically operated, connected to an arm 60 pivotally mounted on a plate 62 fixed to the frame and connected to bracket 64 fixed to angle member 50. When cylinder 58 is actuated angle member 50, and knife blade 52, will be moved up and down relative to knife blade 56.

Take-away conveyor 14 starts at a point immediately down from shear assembly 48 and extends away from the shear assembly. More particularly, the take-away conveyor consists of a plurality of continuous conveyor straps 66 which extend around a driven pulley 68 and an idler pulley 70. Pulley 68 is driven by motor 72 connected to the pulley by a conventional drive train 74. The filter medium from roll 18 moves onto belts 66 of conveyor 14 as it is drawn from roll 18. After a filter pad 16 has been cut from the continuous medium, that cut pad is carried away from the cutters by conveyor 14.

Operation of shear assembly 48 is controlled by an electric eye arrangement which consists of a detector 76 positioned above conveyor 14 and a light source 78 positioned below the conveyor. Detector 76 includes a conventional control arrangement which is connected to both the control for activating cylinder 58 and also to the operator for clutch 34. The clutch and the shear are controlled together so when the electric eye arrangement is operated, clutch 34 interrupts the drive connection to pinch rolls 28 and 30 thereby effectively stopping travel of th filter medium as shear assembly 48 is operated to sever a pad 16. More specifically, when the leading edge of the filter medium being drawn from roll 18 passes between detector 76 and light source 78, the electric eye control is actuated disengaging clutch 34 and operating cylinder 58. When angle member 50, and upper blade 52, are returned to their up position, the electric eye detector 76 is reset, reengaging clutch 34 to draw another length of filter media through the shear assembly. It will be appreciated that during the cutting operation, conveyor 14 remains energized so that belts 66 are moving but slide relative to the terminal portion of the filter medium which is held in place by the stopped pinch rolls. As soon as that portion is severed, it is taken away rapidly by conveyor 14, and this movement is coordinated with the resetting of electric eye 76 so tha the electric eye will not be reset to operate the shear until after it has again seen the light source 78 between the end of the previously cut pad 66 and that of the up coming filter material.

Electric eye detector 76 is connected to an elongated rod 80 which is in turn supported from angle brackets 82 and 84 by bolts 86, two such bolts being provided and being relatively spaced along the longitudinal axis of rod 80. These bolts are not visible in FIG. 1 because they are behind elongated rods 88 and 90 (two pairs of which are provided, one on either side of the conveyor 14) and which are connected to the frame of the overall machine, only a portion of which 92 and 94 is visible in FIGS. 1 and 2. Similarly, light source 78 is supported from an elongated rod 99 positioned between the upper and lower extensions of belts 66. Both rods 80 and 99 are provided with mounting holes 97 and 103 spaced along the length thereof to permit longitudinal adjustment of electric eye detector 76 and light source 78, each independent of the other, to provide for adjustment in the length of pad cut.

Spring 101 is mounted on the upstream end of rod 80 and merely acts to hold the filter pad in engagement with conveyor 14 to insure rapid pick-up of the cut pad and transfer thereof by the take-away conveyor.

With the description to this point, it can be seen that the continuous strip of filter medium stored in cradle assembly 20 is moved through the shear assembly 48 by the pinch rolls and hump-back conveyor. It is severed into desired pad lengths 16 which are transported down from the cutting assembly to roll station 10.

Turning now the roll station, the station includes a frame 96 only a portion of which is shown in the drawings for convenience. In general terms, the cut filter pads are coiled into roll 98 between adjacent turns of a flexible support medium, such as kraft paper of the like. The roll material, i.e., the kraft paper, can be any material which is flexible yet has the requisite strength to support the filter pads and maintain a tightly coiled state in roll 98.

More specifically, a supply roll 100 of kraft paper is carried on shaft 102 supported by frame 96.

The paper 104 from supply roll 100 is threaded over idler rollers 106, 108, and 110 all supported from frame 96. The paper proceeds in an S-pattern around and through two spaced head rolls 112 and 114. Head rolls 112 and 114 are driven, at a constant speed, by a conventional constant speed motor 116 through drive train 118. Roll 98 is supported on a tube 116 which slides onto a driven shaft 118. Shaft 118 is connected to an electric motor 120 through a conventional drive train 122. The speed of motor 120 is controlled by SCR control 124. The SCR control 124 is a conventional torque sensitive control, i.e., the SCR control senses the torque on motor 120, which is indicative of the torque on the paper being coiled into roll 98, and automatically adjusts the speed of rotation of shaft 118 to thereby adjust the rotational speed of roll 98 to maintain a constant peripheral speed of roll 98 and, thereby, maintain constant tension on the paper.

As can be seen in FIG. 1, a generally horizontal extension or web 126 of paper is provided between head roll 114 and 98. The driven speed of head rolls 112 and 114 and roll 98 is set so that they are substantially equal, the SCR motor control decreasing the speed of motor 120 to decrease the peripheral speed of roll 98 as the diameter of the roll increases by sensing and responding to the torque on the motor. In other words, as the roll increases in diameter, the peripheral speed of the roll would increase thereby increasing the tension on web 126 and correspondingly the torque required from motor 120, automatic compensation for that increased torque condition maintains a constant speed condition between driven rollers 112 and 114 and the periphery of roll 98. The relative speeds are also set such that a desired degree of tension is maintained on web 126 to provide a tightly coiled roll 98 and to compress the cut filter pads 16 between adjacent turns of roll 98.

With this arrangement, cut filter pads 16 are delivered from take-away conveyor 14 onto web 126, a kraft paper support. The cut pads are then carried by the web into roll 98 wherein the kraft paper is recoiled to form roll 98 with the cut pads interleaved in a compressed state between adjacent turns of the roll.

The operation of the roll station, and the overall machine, is controlled through a mechanism adjacent the machine including counter 128 and control panel 130 which are connected to count the number of times shear assembly 48 is operated thereby giving a count of the number of filter pads which are cut. When the prescribed number of filter pads have been cut, the shear assembly 48, pinch rolls 28 and 30, and the hump-back conveyor 22 are shut down as are take-away conveyor 14 and the drive for shaft 118 and head rollers 112 and 114 in the roll station. At this point, the web 126 is cut and the severed end is taped over roll 98 to complete the roll. The roll 98 together with tube 116 is removed from shaft 118 and can be placed into a suitable carton for shipping. A new tube 116 is positioned on shaft 118, a number of turns of paper are wound onto the tube to provide a driving engagement and the overall machine re-energized to proceed through another cycle.

Completing the control arrangement for the overall machine, control panel 130 is provided to permit the operator to control the overall operation and counter 128 is a part of that control panel. Also, limit switch 132 is associated with supply roll 100. When the paper on roll 100 is exhausted, the limit switch will de-energize the entire assembly to prevent continued cutting of the pads without the roll station being operational.

It will be seen that this invention provides a means whereby the cut pads are stored in a compact state and also a means which inherently holds the pads in that compact state through storage without further attention. Moreover, the pads can be dispensed one at a time by merely unwinding the paper from roll 98 to expose a single pad without effecting the compressed state of the other stored pads.

Although but one embodiment of the present invention has been illustrated and described, it will be apparent to those skilled in the art that various changes and modifications may be made therein without departing from the spirit of the invention or from the scope of the appended claims.

We claim:

1. Apparatus adapted to compactly roll filter material and comprising, in combination,
    a length of support material having strength in tension but also being flexible so that said support material can be turned on itself into a spiral roll form while providing support for said filter material,
    a take-up roll,
    means supporting said take-up roll for rotation,
    said support material extending to and engaged on said take-up roll for rotation therewith so that said support material is coiled onto said take-up roll,
    means supporting said filter material for introduction with said support material into the coil being formed so that said filter material is positioned between adjacent turns of said support material in said roll form and is held in said roll form,
    and means for driving said take-up roll to draw said support material into said roll form and maintain said support material under tension as it is drawn into said roll form so that said support material is tightly coiled into said roll form and said filter material is held between adjacent turns of said support material in a compressed state.

2. Apparatus adapted to compactly roll filter material and comprising, in combination,
    a length of support material having strength in tension but also being flexible so that said support material can be turned on itself into a spiral roll form while providing support for said filter material,
    a take-up roll,
    means supporting said take-up roll for rotation,
    said support material extending to and engaged on said take-up roll for rotation therewith so that said support material is coiled onto said take-up roll,
    means supporting said filter material or introduction with said support material into the coil being formed so that said filter material is positioned between adjacent turns of said support material in said roll form and is held in said roll form,
    means defining a support matrix for said support material through which said support material is threaded in extending to said take-up roll,
    said support matrix including roller means over which said support material is threaded prior to entry thereof into the coil being formed,
    means for rotating said roller means at a preselected speed,
    and means for rotating said take-up roll and operative to vary the speed of rotation of said take-up roll to maintain the speed of entry of said support material into the coil substantially equal to said preselected speed of said roller means,
    whereby said support material is introduced into said roll form under tension so that said support material is tightly coiled into said roll form and said filter material is held between adjacent turns of said support material in a compressed state.

3. The apparatus of claim 2 wherein said means for rotating said take-up roll includes a motor,
    and a torque responsive control connected to and controlling said motor, said torque responsive control sensing the torque on said motor and adjusting the speed of said motor to maintain a relatively constant torque on said motor and thereby maintain the speed of entry of said support material into said coil constant.

4. The apparatus of claim 2
    wherein said support matrix and said take-up roll define a generally horizontal extension of said support material just prior to entry of said support material into said roll form,
    and wherein said filter material is positioned on said horizontal extension of said support material.

5. The apparatus of claim 1 including means defining a support matrix for said support material through which said support material is threaded in extending to said take-up roll, wherein said support matrix and said take-up roll define a generally horizontal extension of said support material just prior to entry of said support material into said roll form, and wherein said filter material is positioned on said horizontal extension of said support material.

6. The apparatus of claim 5 wherein said filter material is in cut pad form.

7. The apparatus of claim 1 wherein said filter material is in cut pad form.

8. The apparatus of claim 1 in combination with means for cutting said filter material into cut pads and for delivering said filter material to said support material for introduction into the coil being formed.

9. Apparatus adapted to compactly roll filter material and comprising, in combination, a length of support material having strength in tension but also flexible so that said support material can be turned on itself into a sprial roll form while providing support for said filter material, a take-up roll, means supporting said take-up roll for rotation, said support material extending to and engaged on said take-up roll for rotation therewith so that said support material is coiled onto said take-up roll, means supporting said filter material for introduction with said support material into the coil being formed so that said filter material is positioned between adjacent turns of said support material in said roll form and is held in said roll form, means for cutting said filter material into cut pads prior to introduction thereof into the coil being formed, means defining a support matrix for said support material through which said support material is threaded in extending to said take-up roll, said support matrix including roller means over which said support material is threaded prior to entry thereof into the coil being formed, means for rotating said roller means at a preselected speed, and means for rotating said take-up roll and operative to vary the speed of rotation of said take-up roll to maintain the speed of entry of said support material into the coil substantially equal to said preselected speed of said roller means, whereby said support material is introduced into said roll form under tension so that said support material is tightly coiled into said roll form and said filter material is held between adjacent turns of said support material in a compressed state.

10. Apparatus adapted to compactly roll filter material and comprising, in combination, a length of support material having strength in tension but also being flexible so that said support material can be turned on itself into a spiral roll form while providing support for said filter material, a take-up roll, means supporting said take-up roll for rotation, said support material extending to and engaged on said take-up roll for rotation therewith so that said support material is coiled onto said take-up roll, means supporting said filter material for introduction with said support material into the coil being formed so that said filter material is positioned between adjacent turns of said support material in said roll form and is held in said roll form, means for introducing said support material into said roll form under tension so that said support material is tightly coiled into said roll form and said filter material is held between adjacent turns of said support material in a compressed state, and means for cutting said filter material into cut pads and for delivering said filter material to said support material for introduction into the coil being formed, said means for cutting said filter material includes, a cutter, means for delivering filter material in continuous form to said cutter, means for varying the amount of extension of said filter material beyond said cutter to vary the length of said cut filter pads, and a conveyor for transporting said cut filter pads to said means for supporting said filter material.

11. The apparatus of claim 10 including means defining a support matrix for said support material through which said support material is threaded in extending to said take-up roll, wherein said support matrix and said take-up roll define a generally horizontal extension of said support material just prior to entry of said support material into said roll form, and wherein said filter material is positioned on said horizontal extension of said support material, and said horizontal extension of said support material positioned adjacent to and extending away from said conveyor.

12. The apparatus of claim 11 wherein said means for rotating said take-up roll includes a motor, and a torque responsive control connected to and controlling said motor, said torque responsive control sensing the torque on said motor and adjusting the speed of said motor to maintain a relatively constant torque on said motor and thereby maintain the speed of entry of said support material into said coil constant.

13. The combination of claim 12 including counter control means for counting the number of pads cut and stopping said apparatus when a predetermined number are cut.

14. The method of compactly rolling filter material comprising the steps of continuously feeding a supply of support material to a rotating take-up roll so that said support material is coiled onto said take-up roll in spiral roll form, introducing filter material into said spiral form simultaneously with said support material so that said filter material is carried into said roll form with said support material and held therein between adjacent turns of support material, and compressing said filter material between said adjacent turns by drawing said support material under tension into said spiral roll form and maintaining said tension on said support material as it is wound into said spiral roll.

15. The method of claim 14 wherein said filter material is cut into filter pads of limited length prior to introduction into said spiral roll form.

* * * * *

PO-1050
(5/69)

UNITED STATES PATENT OFFICE
CERTIFICATE OF CORRECTION

Patent No. 3,813,843          Dated   June 4, 1974

Inventor(s)   JAMES E. WOOLDRIDGE and RONALD P. MARTIN

It is certified that error appears in the above-identified patent and that said Letters Patent are hereby corrected as shown below:

Column 6, line 27 (Claim 2), after "material" and before "introduction", the word "or" should be --for--.

Signed and sealed this 8th day of October 1974.

(SEAL)
Attest:

McCOY M. GIBSON JR.
Attesting Officer

C. MARSHALL DANN
Commissioner of Patents